US010517238B2

(12) United States Patent
Sporrer et al.

(10) Patent No.: US 10,517,238 B2
(45) Date of Patent: Dec. 31, 2019

(54) IMPLEMENT OPTIMIZATION BY AUTOMATED ADJUSTMENTS

(71) Applicant: Deere & Company, Moline, IL (US)

(72) Inventors: Adam D. Sporrer, Huxley, IA (US); Shawn J. Becker, Centralia, KS (US); Jacob W. Cross, Norwalk, IA (US)

(73) Assignee: DEERE & COMPANY, Moline, IL (US)

( * ) Notice: Subject to any disclaimer, the term of this patent is extended or adjusted under 35 U.S.C. 154(b) by 148 days.

(21) Appl. No.: 15/707,570

(22) Filed: Sep. 18, 2017

(65) Prior Publication Data

US 2019/0082625 A1    Mar. 21, 2019

(51) Int. Cl.
| | | |
|---|---|---|
| *A01G 25/09* | (2006.01) | |
| *A01B 63/00* | (2006.01) | |
| *A01B 69/00* | (2006.01) | |
| *A01B 79/00* | (2006.01) | |
| *A01G 25/02* | (2006.01) | |

(52) U.S. Cl.
CPC .......... *A01G 25/097* (2013.01); *A01B 63/002* (2013.01); *A01B 69/004* (2013.01); *A01B 79/005* (2013.01); *A01G 25/023* (2013.01)

(58) Field of Classification Search
CPC .. A01G 25/097; A01G 25/023; A01B 79/005; A01B 69/004; A01B 63/002
See application file for complete search history.

(56) References Cited

U.S. PATENT DOCUMENTS

| | | | |
|---|---|---|---|
| 2,701,508 A | | 2/1955 | Richey |
| 4,355,690 A | * | 10/1982 | Jensen ................. A01B 73/044 172/311 |
| 4,382,608 A | * | 5/1983 | Konz ...................... B60D 7/00 172/313 |
| 4,566,553 A | * | 1/1986 | McCutcheon ....... A01B 51/026 180/14.2 |
| 4,569,296 A | * | 2/1986 | Miller ................. A01B 73/005 111/123 |
| 5,040,119 A | | 8/1991 | Hardy et al. |
| 5,924,371 A | * | 7/1999 | Flamme ............... A01B 79/005 111/177 |

(Continued)

FOREIGN PATENT DOCUMENTS

| | | |
|---|---|---|
| EP | 0838141 A2 | 4/1998 |
| EP | 1273216 A1 | 1/2003 |

(Continued)

OTHER PUBLICATIONS

European Patent Office, Munich Germany; European Search Report; dated Dec. 21, 2018; pp. 1-7.

*Primary Examiner* — Mussa A Shaawat
(74) *Attorney, Agent, or Firm* — Taft Stettinius & Hollister LLP; Stephen F. Rost

(57) ABSTRACT

An implement adjusting system having an implement with a plurality of adjustable components, a plurality of input values, at least one controlled system configured to adjust at least one of the plurality of adjustable components, and a controller that receives the plurality of input values, the controller configured to reposition the plurality of adjustable components based on the plurality of input values. Wherein, the plurality of adjustable components are repositionable by the controller based on the input values.

20 Claims, 4 Drawing Sheets

(56) References Cited

U.S. PATENT DOCUMENTS

| | | | |
|---|---|---|---|
| 5,956,255 A * | 9/1999 | Flamme | A01B 79/005 |
| | | | 111/903 |
| 6,009,354 A * | 12/1999 | Flamme | A01B 79/005 |
| | | | 172/4.5 |
| 6,024,035 A * | 2/2000 | Flamme | A01B 79/005 |
| | | | 111/178 |
| 6,091,997 A * | 7/2000 | Flamme | A01B 79/005 |
| | | | 111/903 |
| 8,924,030 B2 | 12/2014 | Wendte et al. | |
| 9,258,938 B2 | 2/2016 | Prickel et al. | |
| 9,992,923 B2 * | 6/2018 | Friggstad | A01C 7/208 |
| 2002/0157841 A1 | 10/2002 | Bernhardt et al. | |
| 2004/0124605 A1 * | 7/2004 | McClure | A01B 69/004 |
| | | | 280/456.1 |
| 2009/0236876 A1 * | 9/2009 | Sawai | B62D 25/10 |
| | | | 296/193.11 |
| 2011/0048749 A1 * | 3/2011 | Beaujot | A01B 51/04 |
| | | | 172/260.5 |
| 2012/0298388 A1 * | 11/2012 | Bauer | A01B 73/065 |
| | | | 172/311 |
| 2013/0068489 A1 | 3/2013 | Blunier et al. | |
| 2014/0174065 A1 * | 6/2014 | Ma | E02F 9/2296 |
| | | | 60/327 |
| 2014/0251648 A1 * | 9/2014 | Staade | E02F 3/7668 |
| | | | 172/796 |
| 2016/0082830 A1 * | 3/2016 | Okamura | F01N 3/2066 |
| | | | 180/309 |
| 2018/0184572 A1 * | 7/2018 | Totten | A01B 49/06 |
| 2018/0255695 A1 * | 9/2018 | Kinzenbaw | A01B 73/005 |

FOREIGN PATENT DOCUMENTS

| | | |
|---|---|---|
| EP | 0838141 B1 | 12/2003 |
| ES | 2361473 A1 | 6/2011 |
| WO | 2017034469 A1 | 3/2017 |

* cited by examiner

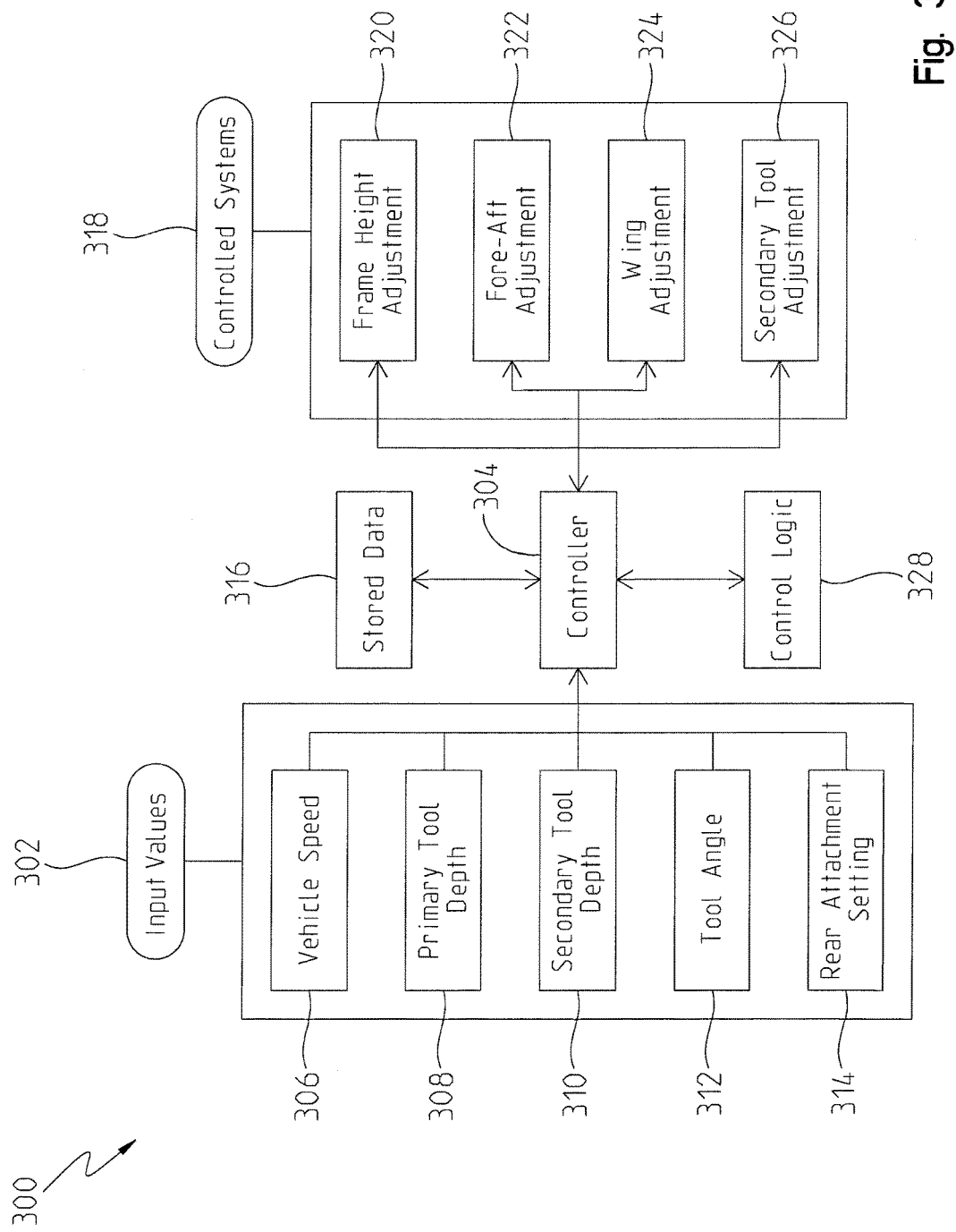

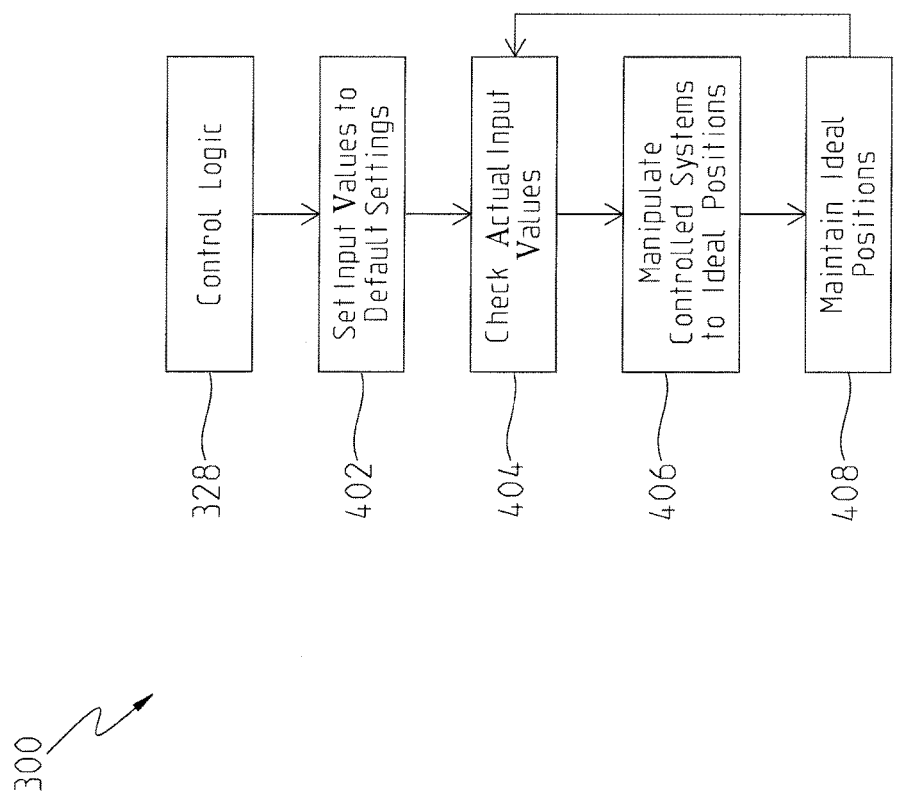

IMPLEMENT OPTIMIZATION BY AUTOMATED ADJUSTMENTS

FIELD OF THE DISCLOSURE

The present disclosure relates to a hydraulic control system, and in particular to a hydraulic control system of an implement of a work machine.

BACKGROUND OF THE DISCLOSURE

In the agricultural industry, wide implements such as field cultivators and the like include a main frame and adjacent outrigger or wing frames that are hinged or pivotably coupled thereto. Conventional control systems require an operator or user to estimate how level the different frames are relative to one another, and also whether each individual frame is level from fore-to-aft. Moreover, many of these systems require human intervention to mechanically adjust the frames to achieve a level position across the width of the machine and in the fore-to-aft direction. This, however, can introduce human error and makes it difficult to achieve precise machine leveling.

In the present disclosure, a control system is described and illustrated for providing automatic machine leveling across multiple frame sections of a work machine and leveling from front to back of each individual frame section.

SUMMARY

One embodiment is an implement adjusting system having an implement with a plurality of adjustable components, a plurality of input values, at least one controlled system configured to adjust at least one of the plurality of adjustable components, and a controller that receives the plurality of input values, the controller configured to reposition the plurality of adjustable components based on the plurality of input values. Wherein, the plurality of adjustable components are repositionable by the controller based on the input values.

In one example of this embodiment, the plurality of input values have a speed value, a primary tool depth value, a secondary tool depth value, a tool angle value, or an attachment setting value.

In another example of this embodiment, the plurality of input values include a primary tool depth value, and an attachment setting value.

In yet another example, the at least one controlled system configured to adjust at least one of the plurality of adjustable components further includes at least one of a frame height adjustment, a fore-aft adjustment, a wing adjustment, or a second tool adjustment.

In one example, the at least one controlled system configured to adjust at least one of the plurality of adjustable components further includes a frame height adjustment and a fore-aft adjustment.

In another example, the plurality of input values include an attachment setting value, the attachment setting value having a first setting value and a second setting value and the at least one controlled system configured to adjust at least one of the plurality of adjustable components further includes a frame height adjustment and a fore-aft adjustment. Wherein, both the frame height adjustment and the fore-aft adjustment are repositioned when the attachment setting is changed from the first setting to the second setting. Another aspect of this example includes a wing adjustment, wherein, the wing adjustment is repositioned when the attachment setting is changed from the first setting to the second setting.

In yet another example, the plurality of input values includes a tool angle value, the tool angle value having at least a first value and a second value. Further, the at least one controlled system configured to adjust at least one of the plurality of adjustable components further includes a wing adjustment and a fore-aft adjustment. Wherein, both the wing adjustment assembly and the fore-aft adjustment assembly are repositioned when the tool angle setting is changed from the first value to the second value.

Another embodiment is a method for maintaining implement alignment, the method including providing an implement having a plurality of movable portions, a controller with a processor and a memory unit, a plurality of input values, and a plurality of controlled systems configured to reposition the movable portions of the implement, storing, in the memory unit of the controller, a plurality of ideal positions, communicating the input values to the controller, selecting one ideal position for the plurality of movable portions, with the controller, based on the input values, and moving the plurality of movable portions to the one ideal position selected based on the input values.

In one example of this embodiment, the movable portions include an adjustable frame height assembly, a fore-aft adjustment assembly, and a wing adjustment assembly. In one aspect of this example, the movable portions include a secondary tool adjustment assembly.

In another example, in each of the ideal positions, at least one of the movable portions is in a different location.

In yet another example, the ideal positions are stored in the memory unit, wherein each combination of input values correlate with an ideal position.

In one example, the input values are pre-set to a default input value. In one aspect of this example, the input values remain at the default input value unless they are changed by a user interface or a sensor value.

Yet another embodiment includes, an implement with a frame, a plurality of movable components coupled to the frame, a plurality of actuators configured to reposition the plurality of movable components relative to the frame, a controller configured to selectively reposition the plurality of movable components via the plurality of actuators, and at least one input value communicated to the controller, the input value indicating at least a first value or a second value. Wherein, each of the plurality of movable components are assigned a first position that corresponds with the first value. Further wherein, the controller positions the movable components in the first position responsive to the at least one input value communicating to the controller the first value.

In one example of this embodiment, the plurality of movable components includes a frame height adjustment assembly and a fore-aft adjustment assembly. In another aspect of this example, the plurality of movable components includes a wing adjustment assembly.

In another example, at least two of the movable components are repositioned by the controller when the input value changes from the first value to the second value.

In yet another example, the input value includes a tool angle value, an attachment setting value, an implement speed value, and a tool depth value. Wherein, each of the tool angle value, attachment setting value, implement speed value, and tool depth value have a pre-set value stored in the controller and the controller implements the pre-set value unless the pre-set value has been changed by the at least one input value.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 is a diagram of a control system; and

FIG. 4 is a diagram of a control logic for the control system of FIG. 3

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
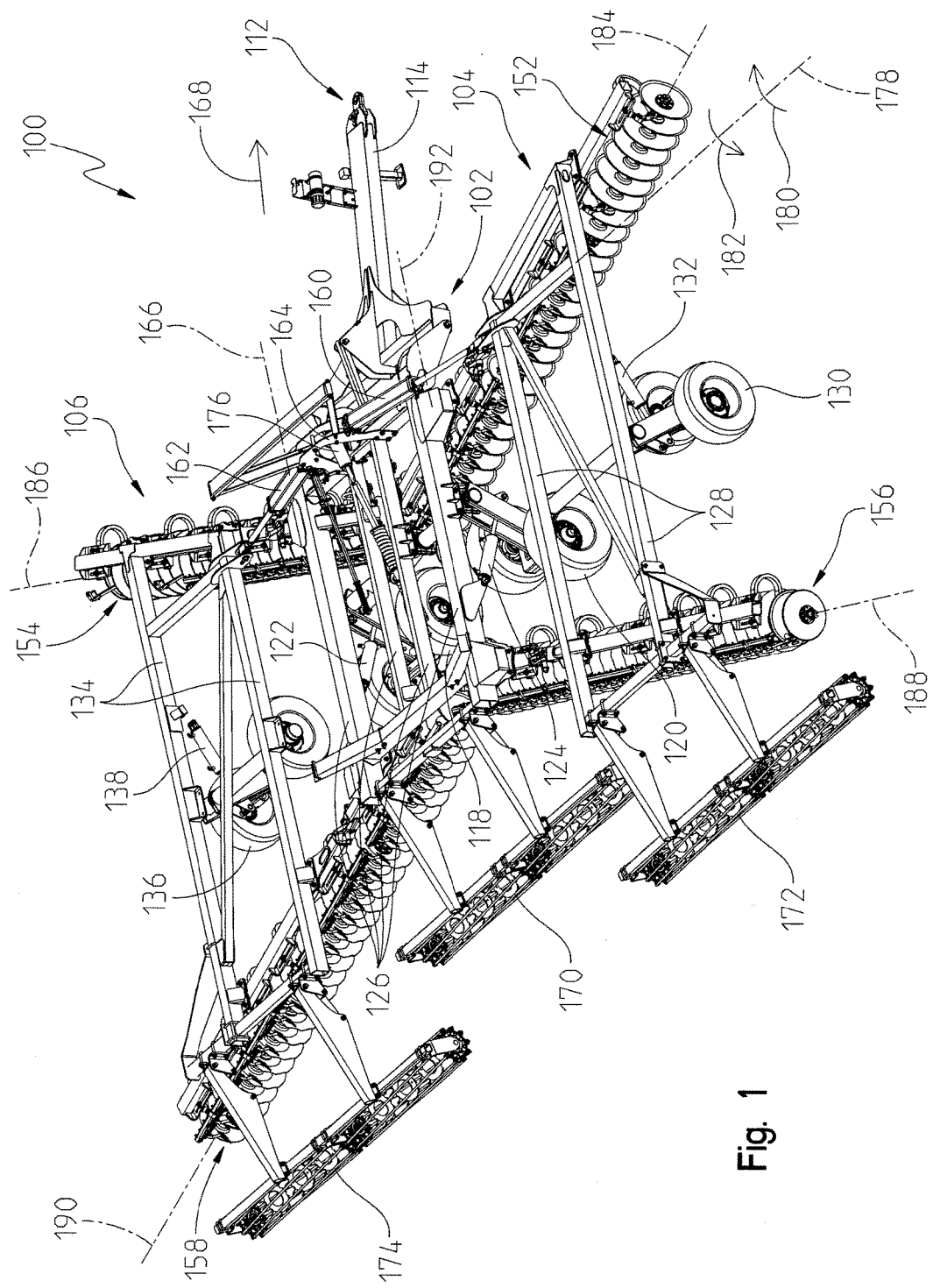
FIG. 1 is an elevated view of one embodiment of an agricultural implement.

Referring to FIG. 1, one non-exclusive example of an agricultural implement 100 is shown. The implement 100 is designed to couple to a work machine and perform a work function. For example, the implement may include work tools that penetrate into soil for aerating the soil before planting or uprooting weeds after planting. The implement 100 may be attached to a work machine or tractor (not shown) by a hitch assembly 112 such as a three-point hitch or a drawbar attachment. The hitch assembly 112 includes a hitch frame member 114 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 112 as shown. A first frame section or first inner frame 104 is disposed to one side of the main frame 102, and a second frame section or second inner frame 106 is disposed to an opposite side thereof.

While only a first and second frame section are shown coupled to the main frame, this disclosure also considers a third frame section coupled to an outside portion of the first frame section 104 and a fourth frame section coupled to an outside portion of the second frame section 106. Each frame section may be pivotably coupled to the frame section adjacent thereto. The first frame section 104, for example, may be pivotably coupled to the main frame 102. Similarly, the second frame section 106 may also be pivotably coupled to the main frame 102.

The implement 100 may be supported by a plurality of wheels. For example, the main frame 102 may be supported by a first pair of wheels 118 and a second pair of wheels 120. The first frame section 104 may be supported by a third pair of wheels 130 and the second frame section 106 may be supported by a fourth pair of wheels 136. While each section is shown being supported by a different pair of wheels, this is only shown in the illustrated embodiment. In other embodiments, there may be only a single wheel supporting each frame section. In a different embodiment, there may be more than a pair of wheels supporting each frame section. Moreover, the implement 100 may include one or more front wheels in addition to those described above. Further still, there may be back wheels disposed near the rear of the implement for additional support.

In the illustrated embodiment of FIG. 1, the agricultural implement 100 may include a plurality of actuators for controlling movement of the frame. Each actuator may be a hydraulic actuator, electric actuator, a pneumatic actuator, an electric motor, or any other known actuator or device. Moreover, each actuator may include an outer body or cylinder in which a rod or piston moves between an extended position and a retracted position. Further, one or more sensors may be positioned throughout the implement to identify the position of one or more of the actuators.

In FIG. 1, the main frame 102 includes a first actuator 122 and a second actuator 124. The first pair of wheels 118 may be coupled to the main frame 102 via a rock shaft (not shown) that may be hydraulically actuated by the first actuator 122. The second pair of wheels 120 may be coupled to the main frame 102 via another rock shaft (not shown) that may be hydraulically actuated by the second actuator 124. The actuators can raise or lower the main frame 102 relative to the wheels 118, 120. Further, one or more sensors (not particularly shown) may be coupled to the actuators, frame, or wheels to determine the height of the main frame 102 relative to the wheels 118, 120.

In FIG. 1, the main frame 102 includes a plurality of main frame members 126. A plurality of tools 152, 154, 156, 158 may be at least partially coupled to the main frame members 126 for engaging a ground surface or soil upon which the implement travels. Similarly, the first frame section 104 includes a plurality of first frame members 128 and the second frame section 106 includes a plurality of second frame members 134. Each of these frame members may be at least partially coupled to one or more of the plurality of work tools 152, 154, 156, 158.

Also shown in FIG. 1 is a first side actuator 160 and a second side actuator 162. The first side actuator 160 may be pivotally coupled between the main frame section 102 and the first frame section 104. Similarly, the second side actuator 162 may be pivotally coupled between the main frame section 102 and the second frame section 106. More specifically, the main frame section 102 may have a support tower 164 providing an elevated coupling location for the first and second actuators 160, 162 relative to the coupling location on the corresponding first and second frame sections 104, 106.

In the above-described configuration, the first side actuator 160 may be selectively repositioned to provide varying levels of force on the corresponding first frame section 104 relative to the main frame section 102. More specifically, the first frame section 104 may be pivotable relative to the main frame section 102 about a first frame axis 192. Accordingly, repositioning or varying the linear displacement of the first side actuator 160 provides a torsional force on the first frame section 104 about the first frame axis 192.

Similarly, the second side actuator 162 may be selectively resized to provide varying levels of force on the corresponding second frame section 106. More specifically, the second frame section 106 may pivot relative to the main frame section 102 about a second frame axis 166. Accordingly, repositioning or varying the linear displacement of the second side actuator 162 provides a torsional force on the second frame section 106 about the second frame axis 166.

In one embodiment, each actuator 160, 162 may also have a corresponding sensor identifying the linear displacement of each actuator 160, 162.

While the first and second side actuators 160, 162 are shown and described towards the front direction 168 of the implement 100, this disclosure contemplates other locations for the actuators 160, 162. Further still, other embodiments may utilize more actuators than just the first and second side actuators 160, 162 to provide the torsional forces on the corresponding frame sections 104, 106. In one embodiment, additional actuators are located at a rear portion of the implement opposite the front direction 168. In this embodiment, two actuators may apply a torsional force to the corresponding frame sections 104, 106 instead of just one. Further still, any number of actuators can be used per side to meet the needs of the particular implement application. Accordingly, this disclosure is not limited to any particular number of side actuators.

In yet another embodiment, additional frame sections may be pivotally coupled to the frame sections 104, 106 utilizing actuators similar to the first and second side actuators 160, 162 to adjust the corresponding relationship of the frame members. More specifically at least one side actuator may be positioned between each additional frame section similarly as described above for the first and second frame sections 104, 106.

In the embodiment shown in FIG. 1, rear attachments 170, 172, 174 are shown coupled to the corresponding frame sections 102, 104, 106. More specifically, a main rear attachment 170 is coupled to a rear portion of the main frame section 102, a first section rear attachment 172 is coupled to a rear portion of the first frame section 104, and a second section rear attachment 174 is coupled to a rear portion of the second frame section 106. The rear attachments 170, 172, 174 may be selectively coupled to the corresponding frame sections 102, 104, 106 or be configured to selectively engage the underlying ground. In one aspect of this embodiment, the rear attachments 170, 172, 174 may have an actuator and a position sensor or the like coupled thereto. In this configuration, the rear attachments 170, 172, 174 may be selectively raised off of the underlying surface or pressed into the underlying surface. Further, the orientation and existence of the rear attachments 170, 172, 174, may alter the forces experienced by the corresponding frame section 102, 104, 106.

While the rear attachments 170, 172, 174 shown in FIG. 1 are flat-bar roller type rear attachments, this disclosure is not limited to such a configuration. Any rear attachment is considered herein, including, but not limited to, harrow-type rear attachments as well.

In yet another aspect of the embodiment illustrated in FIG. 1, a fore-aft actuator 176 may be coupled to the main frame section 102. More specifically, the fore-aft actuator 176 may be coupled to a portion of the support tower 164 on a first end and to the main frame section 102 at a second end. The main frame section 102 and the corresponding first and second frame sections 104, 106 may be pivotally coupled to the hitch assembly 112 or other portion of the implement 100. More specifically, the frame sections 102, 104, 106 may pivot about a transverse axis 178 in a fore direction 180 or an aft direction 182. In this non-limiting example, the fore-aft actuator 176 may be selectively repositionable to alter the orientation of the frame sections 102, 104, 106 in the fore direction 180 or the aft direction 182 about the transverse axis 178. Further, the fore-aft actuator 176 may have a position sensor or the like (not particularly shown) that indicates the fore-aft position of the frame sections 102, 104, 106.

In yet another aspect of the embodiment shown in FIG. 1, a tool axis 184, 186, 188, 190 may be defined through each of the respective work tools 152, 154, 156, 158. Each tool axis 184, 186, 188, 190 may be adjustable relative to the transverse axis 178 to provide a different tool angle. By varying the tool angle of the work tools 152, 154, 156, 158, the implement can better accommodate different ground conditions. Accordingly, actuators and sensors or the like may also be coupled to the work tools 152, 154, 156, 158 to provide varying work tool angles.

While FIG. 1 represents an illustrated embodiment of an agricultural implement with three frame sections, this disclosure is not limited to this embodiment. Other embodiments may include only one section. Alternatively, there may be more than three frame sections in further embodiments. Thus, this disclosure is not limited to any number of frame sections, and the teachings herein may be applicable to any implement regardless of the number of frame sections it contains.

Figure 2:
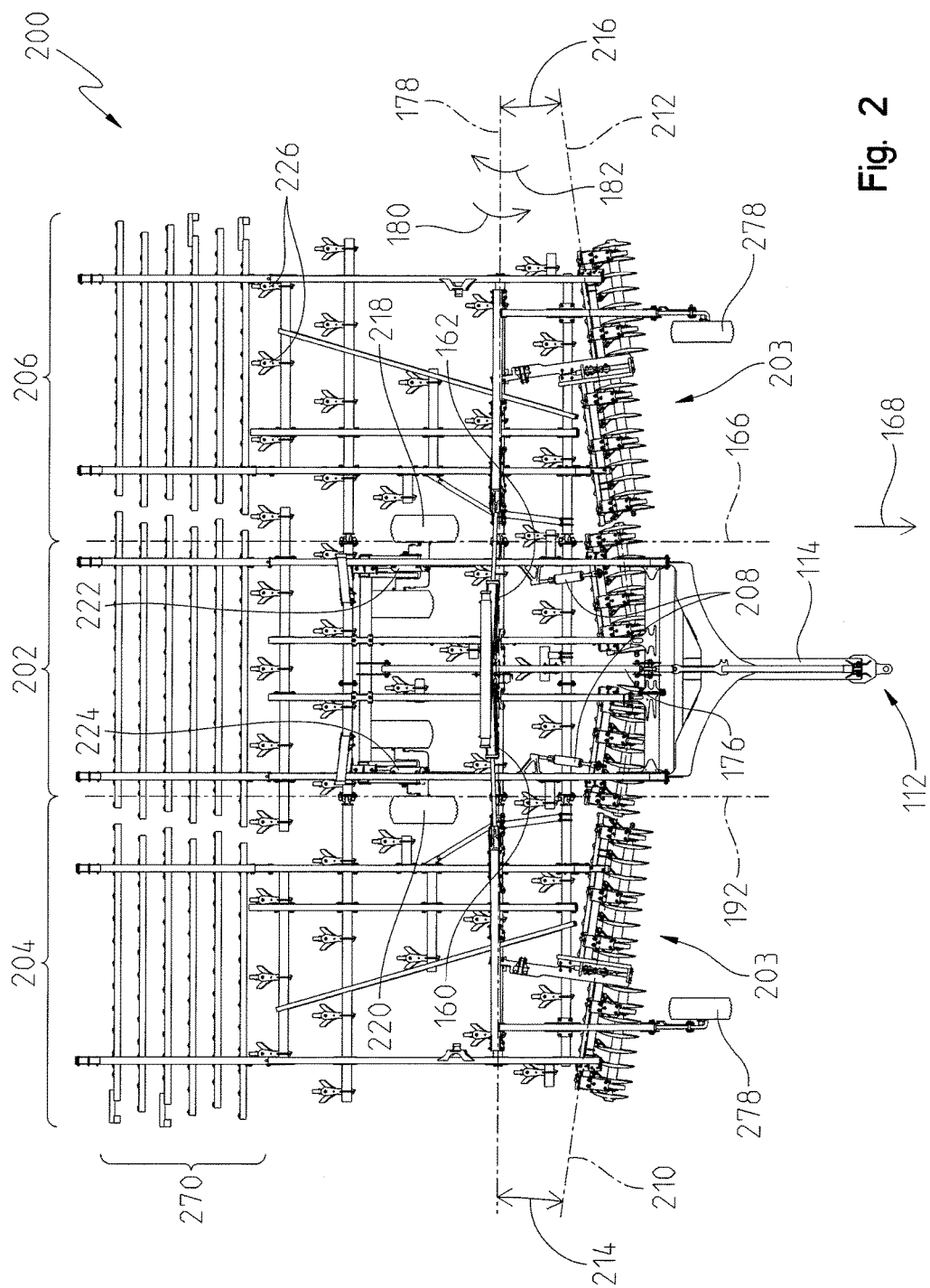
FIG. 2 is a top view of another embodiment of an agricultural implement.

Referring now to FIG. 2, another embodiment of an implement 200 is shown. The implement 200 may have many similar features of the implement 100 described above for FIG. 1. More specifically, the implement 200 may have a hitch assembly 112 and a hitch frame 114. The implement may have at least a main frame section 202 and a first and second frame section 204, 206 coupled thereto on either side. Further, a first and second pair of wheels 218, 220 may be pivotally coupled to the implement 200 via a first and second actuator 222, 224. Further, the implement 200 may also have a first and second side actuator 160, 162 configured to pivot the respective frame section 204, 206 about the corresponding frame axis 192, 166 as described above for FIG. 1. Further still, the implement 200 may also have a fore-aft actuator 176 configured to rotate the main frame about the transverse axis 178 as described above.

FIG. 2 also shows a plurality of front work tools 203 pivotally coupled to the corresponding frame sections 202, 204, 206. In the embodiment shown in FIG. 2, the plurality of front work tools 203 may be pivotally coupled to the corresponding frame sections 202, 204, 206 through one or more front work tool actuators 208. Similar to FIG. 1, the implement 200 of FIG. 2 may also define tool axis 210, 212 that may be selectively offset from the transverse axis 178 at a tool angle 214, 216. In one embodiment, the front tool actuator 208 may be repositionable to alter the tool angle 214, 216 of the plurality of front work tools 203 In yet another aspect of this example, one or more sensors may be coupled to the implement to determine the orientation of the plurality of front work tools 203.

The implement 200 may also have a plurality of rear work tools 226 that are different from the plurality of front work tools 203. In this embodiment, the fore-aft actuator 176 may control the tool depth of the plurality of front work tools 203 relative to the plurality of rear work tools 226. More specifically, while the first and second actuators 222, 224 may selectively reposition the corresponding first and second pairs of wheels 218, 220 relative to the frame, the fore-aft actuator 176 may control the fore-aft rotation 180, 182 of the implement 200 relative to the transverse axis 178. In other words, the first and second actuators 222, 224 may be repositionable along with the fore-aft actuator 176 to establish a desired tool depth for both the plurality of front work tools 203 and the plurality of rear work tools 226.

In one non-exclusive example, if the tool depth of the plurality of front work tools 203 is desired to be lower than the tool depth of the plurality of rear work tools 226, then the fore-aft actuator 176 may reposition to rotate the implement in the fore direction 180, thereby increasing the tool depth of the plurality of front work tools 203 relative to the plurality of rear work tools 226. Alternatively, if the tool depth of the plurality of front work tools 203 is desired to be higher than the tool depth of the plurality of rear work tools 226, then the fore-aft actuator 176 may reposition to rotate the implement in the aft direction 182, thereby decreasing the tool depth of the plurality of front work tools 203 relative to the plurality of rear work tools 226.

The implement 200 may also have a rear attachment 270 removably coupled to each of the frame sections 202, 204, 206. The rear attachment 270 may be a harrow-type attachment that is removably coupled to the rear end of the corresponding frame sections 202, 204, 206. In one embodiment, the rear attachment 270 may also have an actuator and a position sensor (not particularly shown) that alters the amount of down pressure exerted by the rear attachment 270 on the underlying surface. Further still, the actuator of the rear attachments 270 may raise the attachment off the underlying surface as well.

Altering the position of any one of the components described above may also affect the positioning of the other components of the implement 100 or 200. More specifically, as described above for the implement 200 of FIG. 2, repositioning the fore-aft actuator 176 rotates the implement 200 in the fore or aft direction 180, 182, thereby changing the tool depth of the various tools coupled thereto. In yet another example, the existence and orientation of a rear attachment 170, 172, 174, 270 also affects the down force experienced by the rear portion of the implement, thereby affecting tool depth among other things. Further still, the depth and angular orientation of the work tools 152, 154, 156, 158, 203 can also affect the remaining components of the implement 100, 200 requiring the first and second side actuators 160, 162 to reposition the corresponding frame sections to ensure even distribution of force throughout the implement 100, 200 as it travels along the underlying surface.

Referring now to FIG. 3, one exemplary control system 300 is shown. The control system 300 may consist of input values 302 that communicate inputs from a user, the work machine, or sensors on the implement to a controller or processor 304 or other similar processing device. The inputs may be from different sources. For example, in one embodiment the input values 302 may be user inputs selected by a user through a user interface. In another example, the input values 302 may be inputs from sensors or the like identifying to the controller 304 the position of portions of different controlled systems 318 or other measureable values of the tractor or implement. In yet another embodiment, the input values 302 may be input values identified by the tractor or other work machine. Further still, the input values 302 may be any combination of user inputs, input values from one or more sensors, or input values from the work machine or tractor.

In one embodiment demonstrated by the non-exclusive list of FIG. 3, the input values 302 include a vehicle speed 306, a primary tool depth 308, a secondary tool depth 310, a tool angle 312, and a rear attachment configuration 314. However, any desirable implement setting can be included in the input values 302 and the embodiment of FIG. 3 is not exhaustive.

The input values 302 may be communicated to the controller 304 through any known communication system including, but not limited to, both wired and wireless signals indicating the input values. Accordingly, this disclosure is not limited to any particular form of signal transmission between the controller 304 and the input values 302. In one embodiment, some of the input values 302 may be part of a vehicle control display in a tractor or other tow vehicle. In this embodiment, the controller 304 may be a processor or controller already utilized for other systems of the tractor and at least some of the input values 302 may be input into the vehicle control display and sent to the processor through a wiring harness of the tractor. Further still, other input values 302, such as vehicle speed 306, may be communicated directly from the tractor to the controller 304 without requiring user interaction.

A person having skill in the relevant art understands the many ways to communicate input values to a controller, and this disclosure is not limited to any particular communication method. In one embodiment, some of the input values 302 may be transmitted to the controller through a wireless device such as a tablet or wireless phone. In this embodiment, the controller 304 may receive the input values 302 wirelessly from the tablet or wireless phone. Further, input values may be transmitted from one or more sensor from any one of the controlled systems 318 or other components of the implement. The one or more sensor may be coupled to the controller through a wire harness or communicate wirelessly with the controller. In either case, the one or more sensor may be used in addition too, or instead of, input values transmitted to the controller through a wireless device or from a user interface of the tractor or work machine.

The vehicle speed 306 may be an input value that allows the controller to identify the desired or actual vehicle speed for the implement. More specifically, in one embodiment the user may set the desired vehicle speed 306 to be any potential vehicle speed for the implement. In one embodiment, the user may use the vehicle speed value 306 to select the ideal implement speed based on field conditions such as moisture and type of soil to name a few.

While the vehicle speed value 306 is shown and described herein as an input value 302 identified by the user, in other embodiments the vehicle speed value 306 is automatically determined in real time based on the current speed of the implement. In other words, instead of being input by the user, the vehicle speed value 306 may be actively communicated to the controller 304 via a different sensor on the implement or the tractor. In this embodiment, the vehicle speed value 306 would not be a user input but rather determined by a vehicle or implement speed sensor substantially in real-time.

The primary tool depth value 308 provides an option for the user or controller to select the depth of the primary work tool relative to the wheels of the implement. In one non-limiting example, the primary work tool may be the work tools 152, 154 of the implement 100 or the plurality of front work tools 203 from the implement 200. In one embodiment, the primary tool depth value 308 indicates to the controller the desired or actual depth of the primary tool relative to the wheels of the implement. The controller 304 may manipulate several actuators of the implement to achieve the primary tool depth as indicated by the primary tool depth value 308. More specifically, both the fore-aft actuator 176 and the actuators of any corresponding wheels may be repositioned to ensure the primary tool depth value 308 is achieved.

In another embodiment, the primary tool depth value 308 may be determined by one or more sensors coupled to the implement and configured to identify the primary tool depth value 308 based on the positioning of portions of the implement 100, 200. More specifically, one or more sensor may be coupled to the frame and the work tools 152, 154, 203 of the implement 100, 200 to identify the primary tool depth value 308. The one or more sensor may identify to the controller 304 the spatial orientation of one or more of the work tools 152, 154, 203 to determine the primary tool depth value 308. Accordingly, in this embodiment the primary tool depth value 308 is the actual primary tool depth relative to the frame of the implement 100, 200 based on input values from one or more sensors.

Similarly, the secondary tool depth value 310 provides an option for the user or controller to select the depth of the secondary work tool relative to the wheels of the implement. In one non-limiting example, the secondary work tool may be the work tools 156, 158 of the implement 100 or the plurality of rear work tools 226 from the implement 200. The secondary tool depth value 310 indicates to the controller 304 the desired or actual depth of the secondary work tool relative to the wheels of the implement. The controller 304 may manipulate several actuators of the implement to achieve the secondary tool depth as indicated by the secondary tool depth value 308. More specifically, both the fore-aft actuator 176 and the actuators of any corresponding wheels may be repositioned to ensure both the primary and secondary tool depth values 308, 310 are achieved.

In another embodiment, the secondary tool depth value 310 may be determined by one or more sensors coupled to the implement and configured to identify the secondary tool depth value 308 based on the positioning of portions of the implement 100, 200. More specifically, one or more sensor may be coupled to the frame and the work tools 156, 158, 226 of the implement 100, 200 to identify the secondary tool depth value 310. The one or more sensor may identify to the controller 304 the spatial orientation of one or more of the work tools 156, 158, 226 to determine the secondary tool depth value 310. Accordingly, in this embodiment the secondary tool depth value 310 is the actual secondary tool depth relative to the frame of the implement 100, 200 based on input values from one or more sensors.

While a primary and a secondary tool depth value 308, 310 has been described for input values 302, this disclosure also considers embodiments where there is no primary or secondary tool. In this embodiment, the user or controller may identify when there is no tool in both the primary and secondary tool location and identify that is the case via the primary and secondary depth values 306, 308. Further, this disclosure is not limited to only the primary and secondary tool depth values 308, 310 described herein and considers any number of tool depth values. More specifically, in other embodiments there may be three or more tool depth values considered by the controller 304.

The tool angle value 312 may indicate to the controller 304 the tool angle 216 relative to the transverse axis 178 as shown in FIG. 2. Altering the tool angle 216 may affect the forces experienced by the frame sections and tools of the implement. Accordingly, many of the actuators of the implement may need repositioned when the tool angle 216 is altered to ensure the implement remains properly aligned with the underlying surface. Similarly, the rear attachment setting value 314 allows the user or controller to identify whether a rear attachment is coupled to the implement, the type of rear attachment, and any additional downforce exerted by the rear attachment.

In one embodiment of the present disclosure, one or more sensors may be positioned on any one of the primary or secondary tools to identify the angle of the tool relative to the transvers axis 178. More specifically, the front work tool actuator 208 may have a position sensor coupled thereto that identifies the length of the actuator 208. In this embodiment, the corresponding work tool may be pivotally coupled to the frame of the implement 100, 200 at a pivot axis. Accordingly, the controller 304 may determine the tool angle value 312 as a function of the length of the actuator 208 and other known dimensions of the implement 100, 200.

A person having skill in the relevant art understands the many ways one or more sensor or other measurement device can be used to determine the tool angle value 312 and this disclosure is not limited to the configuration described herein. More specifically, other embodiments may include a position sensor at the pivot axis of the work tool. The position sensor communicates to the controller 304 the tool angle value 312 based on the angular position of the work tool relative to the pivot axis based on the position sensor value. Any type or position of one or more sensor is considered to communicate with the controller 304 to determine the tool angle value 312, and this disclosure is not limited to those described herein.

Once the controller 304 receives the input values 302, the controller 304 may compare the input values to stored data 316 stored within a memory unit or the like of the controller 304. The stored data 316 may include a plurality of input values 302 or functions thereof for the various components of the implement under ideal conditions. More specifically, the stored data 316 may have default values identified therein that correlate with different orientations of the controlled systems 318. The default values may correlate with the ideal orientation of the controlled systems of the particular implement 100, 200 under normal field conditions. In other words, referring to the implement 100 of FIG. 1, the default position may assume primary work tools 152, 154, and secondary work tools 156, 158 all oriented at a default tool angle that correlates with a particular tool angle value 312. Further, the default position 100 of FIG. 1 may also assume rear attachments 170, 172, 174 set to exert a predefined pressure on a level underlying surface. Further, the default values may assume a standard primary and secondary tool depth and vehicle speed.

The controller 304 may also direct the controlled systems 318 of the implement. The controlled systems 318 may include a frame height adjustment 320, a fore-aft adjustment 322, a wing adjustment 324, and a secondary tool adjustment 326 to name a few.

The frame height adjustment 320 may utilize the actuators 122, 124, 132, 138 of the implement 100, or actuators 222, 224 of the implement 200 to alter the frame height relative to the corresponding wheels, and in turn the underlying surface. Accordingly, the frame adjustment 320 may primarily dictate the primary and secondary tool depth. Further still, the frame height adjustment 320 may have one or more sensor coupled thereto to identify the orientation of the frame relative to the corresponding wheels. More specifically, the actuators 122, 123, 132, 138, or 222, 224 of the implement 200, may have position sensors coupled thereto that communicate the position of the actuators 122, 123, 132, 138, 222, 224 to the controller 304.

The fore-aft adjustment 322 may utilize the fore-aft actuator 176 of the implement 100 from FIG. 1 to manipulate the positioning of the work tools 152, 154, 156, 158. More specifically, referring to FIG. 1, if the fore-aft actuator 176 rotates the implement sufficiently about the transverse axis 178 in the aft direction 182, the rear work tools 156, 158 will have a deeper working depth than the front work tools 152, 154. Alternatively, if the fore-aft actuator 176 rotates the implement sufficiently about the transverse axis 178 in the fore direction 180, the front work tools 152, 154 will have a deeper working depth than the rear work tools 156, 158. Accordingly, the fore-aft adjustment 322 may provide a way to alter the fore-aft orientation of the implement 100.

In one embodiment of this disclosure, the fore-aft actuator 176 may have one or more sensor coupled thereto to identify the fore/aft positioning of the frame. More specifically, the fore-aft actuator 176 of the implement 100 may have position sensors coupled thereto that communicate the position of the fore-aft actuator 176 to the controller 304. In this embodiment, the fore-aft actuator 176 may be repositioned based on any of the input values 302 to ensure the implement 100 remains in proper alignment with the underlying surface during ideal conditions.

The wing adjustment 324 may utilize the side actuators 160, 162 to ensure that consistent downforce is applied across the corresponding frame sections 102, 104, 106 (FIG. 1), 202, 204, 206 (FIG. 2). More specifically, the implement may not provide consistent downforce across the corresponding frame sections under certain tool depth, tool angle, attachment setting, and vehicle speed conditions. To account for this potential inconsistency, the first and second side actuators 160, 162 may be repositioned by the controller 304 to ensure proper downforce across the corresponding frame sections in view of the input values 302.

Further still, in one embodiment of this disclosure, the side actuators 160, 162 may have one or more sensor coupled thereto to identify the positioning of the frame sections 102, 104, 106 of the implement. More specifically, the side actuators 160, 162 of the implement 100 may have position sensors coupled thereto that communicate the position of the side actuators 160, 162 to the controller 304. In this embodiment the side actuators 160, 162 may be repositioned based on any of the input values 302 to ensure the implement 100 remains in proper alignment with the underlying surface during ideal conditions.

The secondary tool adjustment 326 may similarly be manipulated by the controller 304 to ensure that the rear work tools 226 are positioned as needed with reference to the input values 302. More specifically, in the embodiment of FIG. 2, there may be a front set of wheels 278 in addition to the first and second pair of wheels 218, 220. In this embodiment, the orientation of both the front set of wheels 278 and the first and second set of wheels 218, 220 may be altered by the controller 304 as part of the second tool adjustment 326.

Similar to the other controlled systems, in one embodiment of this disclosure the front set of wheels 278 may have one or more sensor coupled thereto to identify the positioning of the front set of wheels 278 relative to the corresponding frame sections of the implement. More specifically, the front set of wheels 278 of the implement 200 may have position sensors coupled thereto that communicate the position of the front set of wheels 278 to the controller 304. The front set of wheels 278 may be repositioned based on any of the input values 302 to ensure the implement 100 remains in proper alignment with the underlying surface during ideal conditions.

The default position values may be pre-set into the stored data 316 so the controlled systems 318 are positioned in the default position if the input values 302 remain unchanged. However, if one of the input values 302 is changed from the default position, the controller 304 may implement a control logic 328 to adjust the controlled systems 318 to an ideal configuration in view of the input values 302. More specifically, the control logic 328 may initially set the controlled systems to the default position 402. In this step, the control logic 328 utilizes the actuators and sensors positioned on the implement to ensure that each of the corresponding components is in the default position. The controller 304 may adjust at least the frame height, fore-aft position, and wing position utilizing the corresponding actuators 122, 124, 132, 136, 176, 160, 162 and sensors to ensure the implement is in the default position.

The control logic 328 may then check the input values 302 and compare the actual input values, or values measured by sensors or sent to the controller from the work machine, to the default input values 404 in the stored data 316. In one nonexclusive example of this embodiment, the input values 302 may be limited and the stored data 316 may have every possible combination of input values 302 stored therein. Accordingly, if the input values 302 are not the default input values 402, the control logic 328 selects which combination of input values in the stored data 316 are represented.

The stored data 316 may also have stored therein the proper position for the corresponding controlled systems 318 for every possible combination of input values 302. In one non-limiting example, if the tool angle setting 312 is changed, the stored data 316 may implement a corresponding change to the first and second side actuator 160, 162 to compensate for the changed tool angle setting 312. Each change in input value 302 may correlate with a change to the controlled systems 318 to ensure proper implement orientation. In other words, the stored data 316 may not only have every possible combination of input values 302 stored therein, it may also associate each combination of input values 302 with particular positioning of the controlled systems 318.

Turning back to the control logic 328, once the input values 302 are identified the controller 304 may compare the input values 302 to those saved in the stored data 316. Then, the control logic 328 may identify which combination of input values 302 stored in the stored data 316 matches the actual input values identified in 404. Once the control logic 318 identifies the proper combination of input values 302, the control logic 318 may instruct the controller 304 to adjust the controlled systems 318 to the corresponding positions via the actuators and sensors described herein. In other words, the stored data 316 has a combination of controlled system 318 positions that correlate with, or are determined as a function of, every combination of input values 302. Accordingly, once the control logic 328 identifies the input values 302, it may associate those inputs with a combination stored in the stored data 316 and adjust the controlled systems 318 accordingly.

The control logic 328 may also maintain the ideal positions 408 of the controlled systems 318 identified in box 406. In this box, the controller 304 may continuously or periodically read sensors on the controlled systems 318 and ensure they are in the ideal position previously identified 406. However, in other embodiments the controller 304 may maintain the ideal positions 408 of the controlled systems 318 without monitoring sensors at all. In this embodiment, once the controller 304 positions the controlled systems 318 in the ideal position 406, the controller 304 may lock the controlled systems 318.

The controller may lock the controlled systems 318 using any method known in the art. More specifically, if the controlled systems 318 are hydraulic or pneumatic systems, the controller 304 may restrict fluid flow to or from the actuators that correspond to the controlled system 318. Further, if the controlled systems are electric actuators, the controller 304 may provide sufficient power to the electric actuators to lock them in the ideal position. Further still, the controller 304 may engage mechanical brakes or the like to hold the controlled systems 318 in the ideal position 408.

The control logic 328 may repeatedly or continuously check the input values 404 for changes. Accordingly, the controller 304 may manipulate the controlled systems 318 at any time to ensure they properly correlate with the input values 302.

In one embodiment of the present disclosure, the controller 304 may also receive data from the user, the tractor, the implement, or other sources regarding soil type and geographic position along with the input values 302. In this embodiment, the soil type and geographic position may be treated as input values 302 and be used to identify the proper orientation of the controlled systems 318.

In one non-exclusive example, the vehicle speed value 306 may be the actual speed of the implement as determined by a speed sensor on the implement or work machine. Further, the vehicle speed value 306 may be determined through any other method of speed determination such as a global positioning system or reference beacon. The vehicle speed value 306 of this example may be eight miles per hour ("MPH"). In this example, the primary tool depth value 308 may be set to three inches, the secondary tool depth value 310 may indicate that there is no secondary tool, the tool angle value 312 may be a default value, and the rear attachment setting value 314 may indicate that the rear attachment is in the raised position. In this configuration, the fore/aft level is at a predefined location to address the added downforce at the rear of the implement caused by the raised rear attachment. In one aspect of this example, if the user decides to engage the rear attachment this would impact the fore-aft level, and the controller 304 would identify the change in the rear attachment setting value 314. Accordingly, the controller would adjust the fore/aft orientation 322 to account for the change in load distribution to the implement.

In a different non-exclusive example, the vehicle speed value 306 may be measured or otherwise determined to be eight miles per hour. The primary tool depth value 306 may be set to three inches, the secondary tool depth value may be a default value of three inches, the tool angle value 312 is four degrees, and the rear attachment setting value 314 indicates to the controller 304 that the rear attachment is in the down position. In this example, if the user changes the tool angle value 312 from four degrees to twelve degrees, the implement may experience an increased down force at the primary tool. The increased downforce at the primary tool pushes the primary tool farther into the ground than desired compared to the primary tool depth value 308. Further, the increased downforce at the primary tool caused by the change in tool angle 312 also alters the actual secondary tool depth compared to the secondary tool depth value 310. Accordingly, when the controller 304 identifies the change in tool angle value 312 it may automatically change the frame height adjustment 320 to ensure the primary tool depth remains at the desired primary tool depth value 308 and that the secondary tool depth remains at the desired secondary tool depth value 310. In other words, the change in tool angle value 312 may naturally drive the primary tool further into the ground if not countered by a change in frame height. When the tool angle value 312 is changed, the controller 304 implements the control logic 328 and reviews the stored data 316 to determine the effect the change in tool angle value 312 will have on the remaining input values 302 and automatically adjusts the controlled systems 318 to reposition so each of the input values 302 are maintained.

The term sensor is used throughout to describe how components of the implement are positioned. A person having skill in the relevant art understands that many different types of sensors may be used and positioned at different locations on the implement to communicate the desired information to the controller. More specifically, at least capacitive displacement, doppler effect, eddy-current, inductive, magnetic, optical, photocell, laser rangefinder, passive infrared, radar, ultrasonic, fiber optic, and hall effect sensors are considered herein. A person having skill in the relevant art understands how many different types of sensors could be used with the components of the controlled systems 318 or to provide actual measured values to the controller 304 and this disclosure is not limited to any particular type of sensor.

Further, while actuators are shown and described throughout, any type of motor or linear displacement mechanism are considered herein. More specifically, one embodiment may use hydraulic or pneumatic actuator assemblies. In this embodiment, fluid may be selectively provided to chambers on either side of a piston within a cylinder to alter the positioning of the piston therein. Further, a rod may be coupled to the piston and extend through an aperture in the cylinder. As the piston is repositioned, the rod may be repositioned therein and alter the linear displacement of the actuator assembly. Other embodiments may utilize electric motors and gearsets to achieve similar results as hydraulic or pneumatic actuators. Accordingly, this disclosure is not limited to any particular type of actuator or other displacement mechanism utilized to move the controlled systems 318.

In one embodiment, the controller may actively determine default values of the stored data 316 as a function of the input values 302. More specifically, the default value for the frame height adjustment 320 may be determined as a function of the vehicle speed value 306. In this embodiment, the frame height adjustment 320 may be actively changed by the controller as the vehicle speed value changes 306. In other words, the frame height adjustment 320 may be lowered as the speed increases or vice versa. Similarly, the fore-aft adjustment 322, wing adjustment 324 and secondary tool adjustment 326 may be altered by the controller 304 as a function of any one of the input values 302. Accordingly, any of the controlled systems 318 may be actively repositioned by the controller 304 as a function of any of the input values 302.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An implement adjusting system, comprising:
an implement having a plurality of adjustable components;
a plurality of input values;
at least one controlled system configured to adjust at least one of the plurality of adjustable components, the plurality of adjustable components including a main frame section and a second frame section pivotally coupled to the mean frame section; and
a controller that receives the plurality of input values, the controller configured to reposition the plurality of adjustable components based on the plurality of input values;
wherein, the plurality of adjustable components are repositionable by the controller based on the input values;
further wherein, the controller is configured to alter the position of the second frame section relative to the main frame section responsive to the input values to provide a substantially consistent downforce to tools on both the main frame section and the second frame section.

2. The implement adjusting system of claim 1, further wherein the plurality of input values comprises a speed value, a primary tool depth value, a secondary tool depth value, a tool angle value, or an attachment setting value.

3. The implement adjusting system of claim 1, further wherein the plurality of input values comprises a primary tool depth value, and an attachment setting value.

4. The implement adjusting system of claim 1, further wherein the at least one controlled system configured to adjust at least one of the plurality of adjustable components further comprises at least one of a frame height adjustment, a fore-aft adjustment, a wing adjustment, or a second tool adjustment.

5. The implement adjusting system of claim 1, further wherein the at least one controlled system configured to adjust at least one of the plurality of adjustable components further comprises a frame height adjustment and a fore-aft adjustment.

6. The implement adjusting system of claim 1:
further wherein, the plurality of input values comprises an attachment setting value, the attachment setting value having a first setting value and a second setting value;
further wherein, the at least one controlled system configured to adjust at least one of the plurality of adjustable components further comprises:
a frame height adjustment; and
a fore-aft adjustment;
further wherein, both the frame height adjustment and the fore-aft adjustment are repositioned when the attachment setting is changed from the first setting to the second setting.

7. The implement adjusting system of claim 6, further comprising a wing adjustment, wherein, the wing adjustment is repositioned when the attachment setting is changed from the first setting to the second setting.

8. The implement adjusting system of claim 1:
further wherein, the plurality of input values comprises a tool angle value, the tool angle value having at least a first value and a second value;
further wherein, the at least one controlled system configured to adjust at least one of the plurality of adjustable components further comprises:
a frame height adjustment; and
a fore-aft adjustment;
wherein, both the frame height adjustment and the fore-aft adjustment are repositioned when the tool angle setting is changed from the first value to the second value.

9. An implement, comprising:
a frame;
a plurality of movable components coupled to the frame, the plurality of movable components including a frame section pivotally coupled to the frame wherein both the frame and the frame section have work tools coupled thereto;
a plurality of actuators configured to reposition the plurality of movable components relative to the frame, at least one of the plurality of actuators coupled between the frame and the frame section to selectively pivot the frame section relative to the frame;
a controller configured to selectively reposition the plurality of movable components via the plurality of actuators; and
at least one input value communicated to the controller, the input value indicating at least a first value or a second value;
wherein, each of the plurality of movable components are assigned a first position that corresponds with the first value and a second position that corresponds with a second value;
further wherein, the controller positions the movable components in the first position responsive to the at least one input value communicating to the controller the first value,
further wherein, the controller is configured to position the movable components in the second position responsive to the at least one input value communicating to the controller the second value;
further wherein, the controller is configured to alter the position of the frame section relative to the frame when the controller transitions the movable components between the first position and the second position.

10. The implement of claim 9, further wherein the plurality of movable components includes a frame height adjustment assembly and a fore-aft adjustment assembly.

11. The implement of claim 10, further wherein the plurality of movable components includes a wing adjustment assembly coupled to the frame section, wherein the wing adjustment assembly is configured to be selectively altered by the controller to modify a downforce applied to the wing assembly relative to the frame.

12. The implement of claim 9, further wherein at least two of the movable components are configured to be repositioned by the controller when the input value changes from the first value to the second value to alter a downforce applied to the work tools of both the frame section and the frame.

13. The implement of claim 9, further wherein the input value comprises:
a tool angle value;
an attachment setting value;
an implement speed value; and
a tool depth value;
wherein, each of the tool angle value, attachment setting value, implement speed value, and tool depth value have a pre-set value stored in the controller and the controller implements the pre-set value unless the pre-set value has been changed by the at least one input value.

14. An implement assembly, comprising:
a hitch assembly;
a main frame coupled to the hitch assembly and having a frame tool;
a first frame section pivotally coupled to the main frame about a first frame axis and having a first frame tool;
a second frame section pivotally coupled to the main frame about a second frame axis and having a second frame tool;

a first side actuator that selectively pivots the first frame section about the first frame axis relative to the main frame;

a second side actuator that selectively pivots the second frame section about the second frame axis relative to the main frame;

a controller that selectively repositions the first and second side actuator; and a user interface that communicates user inputs to the controller;

wherein, at least one of the user inputs is an orientation of at least one of the frame tool, the first frame tool, or the second frame tool and the controller is configured to reposition the first and second side actuator to correspond with the user input to provide a consistent downforce to the frame tool, the first frame tool, and the second frame tool.

15. The implement assembly of claim 14, further wherein the main frame is pivotally coupled to the hitch assembly about a transverse axis, the transverse axis being substantially perpendicular to the first frame axis and the second frame axis.

16. The implement assembly of claim 15, further comprising a fore-aft actuator in communication with the controller and configured to selectively pivot the main frame about the transverse axis relative to the hitch assembly.

17. The implement assembly of claim 16, further wherein the first and second frame sections are pivotally coupled to the main frame such that pivoting the main frame about the transverse axis pivots the first and second frame sections about the transverse axis.

18. The implement assembly of claim 17, further wherein the controller is configured to reposition the fore-aft actuator to correspond with the user input to provide a consistent downforce to the frame tool, the first frame tool, and the second frame tool.

19. The implement assembly of claim 13, further wherein the user inputs comprise a primary tool depth value and a secondary tool depth value.

20. The implement assembly of claim 13, further wherein the user inputs comprise an attachment setting configured to indicate to the controller when an attachment is coupled to the implement assembly and the controller is configured to reposition the first and second side actuator based on the attachment setting, the attachment being any one of a flat-bar roller or a harrow attachment.

* * * * *